Figure 1:
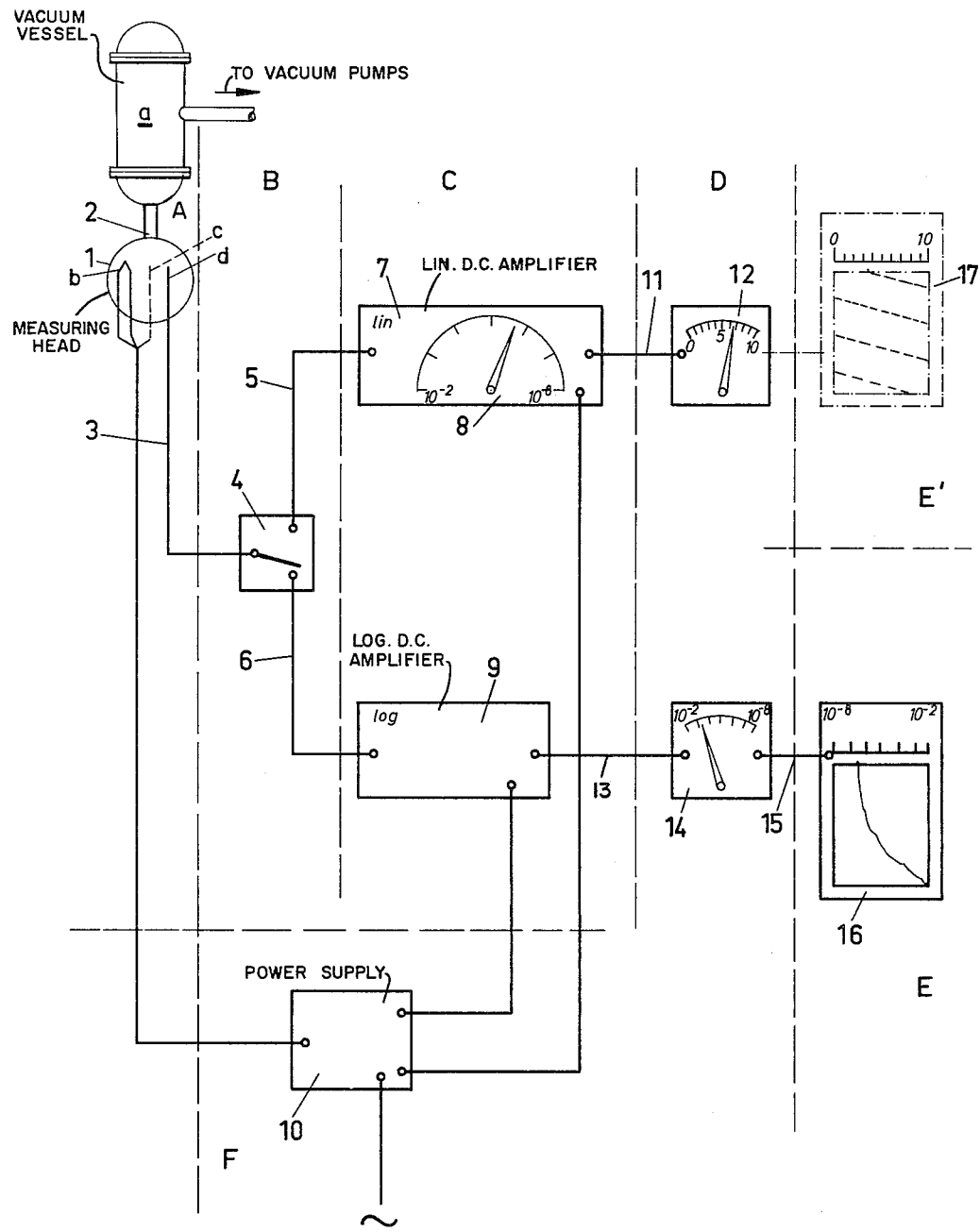

United States Patent Office 3,227,947
Patented Jan. 4, 1966

3,227,947
IONIZATION VACUUM METER WITH SWITCHING MEANS FOR LINEAR AND LOGARITHMIC RESPONSES
Klaus Georg Müller, Greutterstr. 57A, Stuttgart-Weilimdorf, Germany
Filed Nov. 24, 1964, Ser. No. 413,510
6 Claims. (Cl. 324—33)

This is a continuation in part of my copending application Ser. No. 129,329, filed Aug. 4, 1961, and now abandoned.

This invention relates to high vacuum and more particular to pressure gauges for measuring vacuum from pressures of the order of $10^{-2}$ Torr down to pressures of the order of $10^{-7}$ Torr or lower. The present invention is concerned with improvements in ionization pressure gauges and especially in a circuit arrangement for the measurement of their ionization currents are described by S. Dushman in his book "Scientific Foundation of Vacuum Techniques," John Wiley & Sons, Inc., New York, 1949, on the pages from 332 to 366.

Vacua of very different intensities are used in vacuum processes. Thus, for instance, the vacuum degasification of larger quanitities of steel practically takes place at pressures of between 30 to $10^{-1}$ Torr and the vapour-depositing of thin coatings at $10^{-3}$ to $10^{-5}$ Torr; on the other hand the production and acceleration of corpuscular beams for atomic processes generally require very high vacua in excess of $10^{-7}$ Torr.

In the measurement of the vacua used, it is, in many cases, very important to know the prevailing pressure exactly (although the type of gas present can often only be very poorly judged and therefore the sizes of measurement become somewhat falsified). This requirement is fulfilled for example in linear measuring devices, such as ionization vacuum meters, by switching over a range of zones of pressure which differ by a power of 10 ($10^{-2}$, $10^{-3}$, $10^{-4}$ . . . Torr) and by means of a precise indication of the pressure which now becomes possible within the tested zone, using an electrical measuring instrument. Such linear measuring vacuum meters, however, have the disadvantage that alterations in pressure over several of the ranges of multiples of 10 (during the evacuating process among others) can be followed only with difficulty. This becomes especially difficult to note when the pressure-cycle is to be supervised on a recording instrument. The connected recording instrument then indicates individual portions of curves for each range of pressure and their evaluation is possible only with further work, requires additional devices for delineating corresponding ranges of measurement and cannot register fast alterations in pressure.

On the other hand the circuit for an ionization manometer has become known which operates with alternating current and, by means of a manually or automatically adjusted potentiometer, makes a logarithmic indication of the pressure over several powers of 10 on a single scale possible. But the measurement of the prevailing pressure in this case is possible only with small and often insufficient precision of measurement. Thus the previous measuring devices suffer from definite disadvantages and do not make it possible to have any sufficient control over the prevailing vacuum which, during the process, is often very important.

An ionization pressure gauge or manometer usually consists of a source for an electron current of controlled intensity as e.g. a heated filament as cathode, an anode with a positive electrical potential relative to the electron source an a ion collector with a negative electrical potential relative to the electron source. The ion collector may be arranged in the space between the electron source and the cathode or outside of this space. The electrons which are generated by the electron source are subjected to the electric field given by the geometrical configuration between the source and the anode and the electrical potentials of these two electrodes. The electrons move through the free space from the source to the anode and during their movement strike the atoms or molecules of the residual gases in this space or outside of it. A part of the atoms or molecules is ionized by these collisions and therefore carries positive electrical charges. The ionized atoms or molecules are attracted by the negative potential of the ion collector and the ion current is measured in a connected circuit arrangement. This ion current is directly proportional to the electron current and the pressure prevailing in the volume through which the electrons move. The magnitude of such ion current amounts e.g. about $10^{-6}$ ampere for an electron current of one ma. and at a pressure of $10^{-4}$ Torr or about $10^{-9}$ ampere at $10^{-7}$ Torr. If the electron current has a fixed magnitude, the ion current can be used for the measurement of the prevailing pressure in the gauge and in an apparatus chamber connected with it.

The described ionization pressure gauge itself in the following is denominated "measuring head" or "feeler." It is connected to several electrical devices for controlling the heating rate of the filament, the electron current and relative electrical potential of the cathode, anode and ion collector. These devices are broadly known in the art and not fully described in the following part of the description and in the drawings. The measuring head, especially its ion collector is furtherly connected to an amplifier and/or to measuring and indicating devices, which may be recording instruments. This part of the circuit arrangement for the measurement of the ion current of the measuring head is fully regarded in the following. The combination of the measuring head and the current arrangement is called "ionization vacuum meter" or "gauge."

I have now found a solution for the above mentioned disadvantages of the prior art. It consists in an usual ionization gauge with a measuring head or feeler the ion current of which is fed into an electric measuring and indicating device. The electric circuit contains two parts the first of which gives a linear response to the ion current (or pressure) and the second a logarithmic one. This may be an additional part complementary to the first part. A switch is provided for switching over from the linear to the logarithmic response or vice versa.

Thus for the first time it is possible to follow the evacuation process, which extends over several ranges of pressure values, with the same device and also to determine the exact value of the pressure during the evenly continuous vacuum process. During the logarithmic measurement a recording instrument is also advantageously switched in with the device, said recorder taking over the logarithmic indication of the evacuation process throughout its course. This recorder can, however, also remain switched on when the machine is periodically switched over to give a linear scale. The particular advantage with this is that the precise measurement of pressure is registered at the same time.

In many cases a continuous logarithmic indication is sufficient for continuous supervision, while occasional precise measurement of individual phases of the vacuum process may be necessary. The latter is the case for example when following short-duration degasification or absorption processes which are carried out within one range of ten. In such a case it is preferable to allow the recorder continuously to register the curve in a logarithmic indication and only to switch over a portion of the amplifier and the indicating device periodically on to linear indication.

In order that the invention may be more clearly understood, reference will now be made to the accompanying drawings, which show three embodiments thereof in block diagrammatic form by way of example.

Referring to the drawings, the entire device is divided into the rough divisions A, B, C, D, E and F which are allocated to defined tasks. This division was selected because, in all the shown variants, the individual tasks are looked after by somewhat similar apparatus. The allocation is as follows:

(A) A measuring head or feeler to transform the pressure values into a measurement value. The head is an ionization gauge head with an ion collector.

(B) A switch for changing over from a linear to a logarithmic scale.

(C) Amplification of the electrical measurement value.

(D) Indication on a scale calibrated in pressures.

(E) The registration of the pressure cycle.

(F) Power supply.

In FIGURE 1 the measuring head or feeler 1 is connected to a vessel $a$ in which the prevailing vacuum has to be measured and watched by means of the pipe 2. This feeler 1 contains an electron source $b$, and anode $c$ and ion collector $d$, as above described. The ion collector is connected by the conductor 3 to the switch 4 which can effect a switchover between the conductors 5 and 6. This switch, which is an essential characteristic of the present invention, is represented as the separate division B.

The conductor 5 leads to the amplifier 7, which has a linear response, and can be switched over on to the diagrammatically shown ranges of measurement by means of the switch 8. The conductor 6 leads to the amplifier 9 with a logarithmic response. These two amplifiers and the measuring head 1 are fed with the required voltages and currents from a main power supply 10.

The amplifier 7 with the response is connected to the linear indicating device 12 by means of the conductor 11. This device 12 has a scale which is, for instance, graduated from 0–10. The conductor 13 leads from the amplifier 9 with a logarithmic response to the indicating device 14, the scale of which is divided logarithmically somewhat in the way shown.

Thus, on the one hand, these two stages give a general indication of the rough pressure (indicating device 14) and, on the other hand, give an exact measurement of the pressure within this range by means of the indicating device 12. It is, however, a particular advantage of the present invention that a recording instrument 16 which is connected to the indicating device (or directly with the conductor 13) via the conductor 15, and is therefore connected to the logarithmic amplifier 9, gives a record of the pressure cycle as a continuous line.

The momentarily prevailing precise pressure may now be easily measured, according to the invention, by taking the switch 14 into its upper position, upon which the device 12 immediately gives an exact and useful indication. If a writer E' (which is shown in broken lines in FIGURE 1) were to be connected to this device, then a set of curves would be produced which would run from one edge of the paper to the other and would make it possible to obtain a good supervision over the pressure cycle only by means of additional work. The greater precision of these curves in the individual ranges of pressure indication are offset by the comparatively poor supervision over the entire results. For the observer, however, it is entirely desirable to be able to examine the exact pressure in addition to having a rough view of the whole and this may be had in a very simple way by switchiing over the switch 4.

Figure 2:
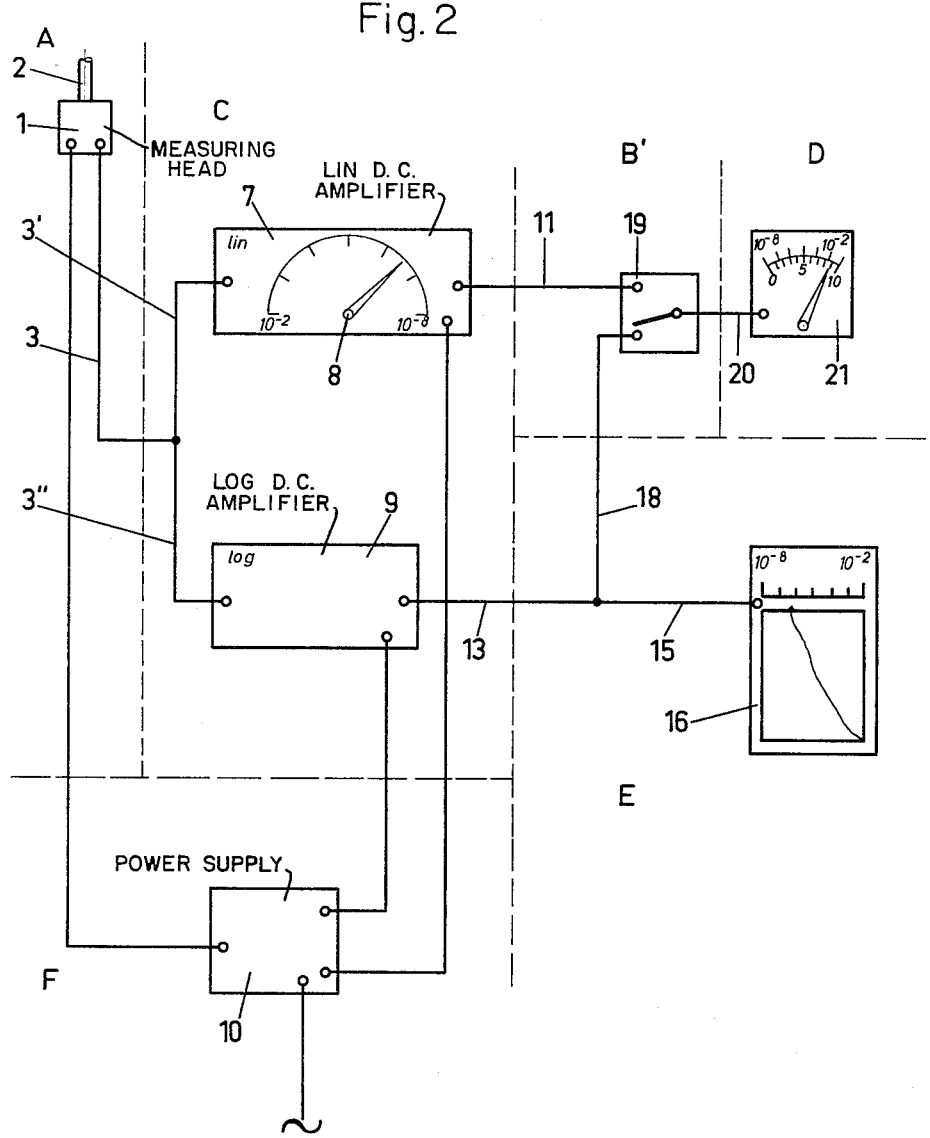

FIGURE 2 shows another embodiment of the invention, in which the measuring head 1 is connected to the linear amplifier 7 and the logarithmic amplifier 9 by means of the conductor 3' and 3". The conductor 13 of the logarithmic amplifier is continued in the conductor 15 and leads directly to the recording instrument 16. From the junction point between the conductors 13 and 15, the conductor 18 goes to a switch 19 into which the conductor 11 from the linear amplifier also leads. This switch 19 permits the conductor 20 to the indicating device 21 to be connected both with the linear and with the logarithmic amplifier. The indicating device 21 thus has both a linear scale which extends from 0 to 10 and a logarithmic scale with the pressure values given. In this device the recorder 16 permanently registers the entire presure curve on a logarithmic scale, while, by means of the switch 19, the indicating device 21 may be used both for exact measurement with a linear scale and for a supervisory measurement with a logarithmic scale.

Figure 3:
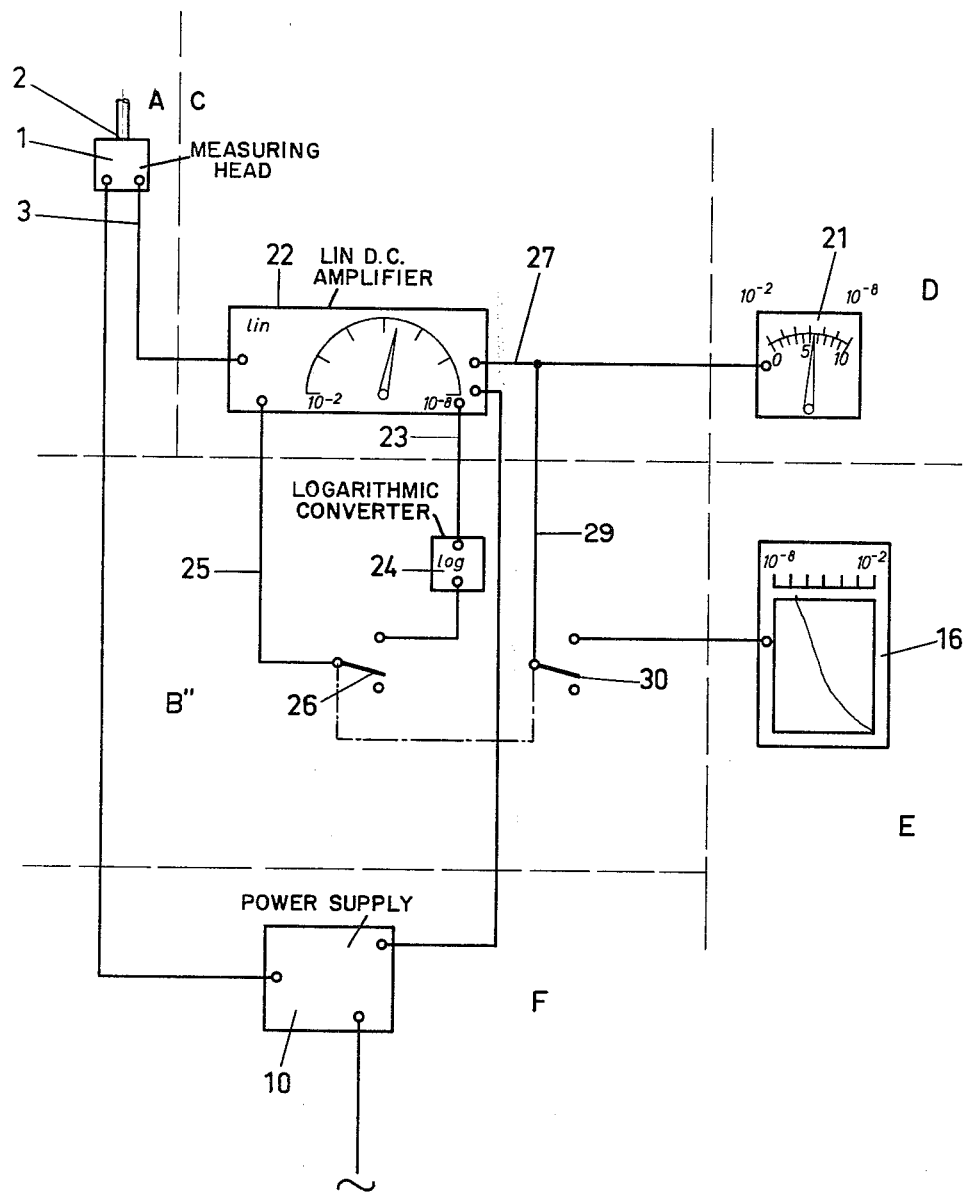

FIGURE 3 shows another embodiment of the invention, in which the amplifier 22 has a linear characteristic. By means of the reversal of one part, it is adapted to have a logarithmic response. This is shown in the drawing in that the conductor 23 from the linear amplifier leads to the switch 26 via an additional member 24, said switch being once more connected to the amplifier via the conductor 25.

Thus, in a way, a feed back is shown which, upon being switched on, gives the amplifier a logarithmic response. The output of the amplifier is connected to the indicating device 21 via the conductor 27. A conductor 29 starts from this output, said conductor leading to the logarithmic writer via the switch 30. The two switches 26 and 30 are always simultaneously switched on whenever a logarithmic response is desired. This device also allows the registration and supervision of the pressure both in the supervisory logarithmic registration and in the very precise linear measurement.

The invention therefore principally consists, as has already been stated, in that the same device enables one to have a logarithmic and/or a linear indication, said indications being capable of being switched on either as desired or simultaneously. Thus a logarithmic indication is preferably selected so as to be able to supervise the entire cycle of evacuation and the vacuum process to be carried out.

It is particularly advantageous in the case of the logarithmic registration of pressure to have an automatic control and registration of the vacuum process dependent upon the pressure. In this case, as in the case of automatic protective measures (switching-off of pumps and measuring devices, the closing of valves etc.) it is only very seldom necessary to use the switching measures at a pre-determined pressure (for example $2.5 \cdot 10^{-4}$ Torr). It is sufficient in nearly every case to start them off upon reaching a range of pressure (about $10^{-4}$ Torr for example). Such a possibility however only offers a measurement which increases logarithmically with the pressure, said measures also providing a logarithmic indication, for the changeover switching of the linear measurement dependent upon the pressure can lead to errors and uncertanties. This continuous supervision, regulation and control of a large important range of pressure is, according to the present invention, connected with the possibility of being able precisely to determine momentarily prevailing pressure.

I claim:

1. In an ionization vacuum meter for measuring pressure changes of a vacuum in a vessel, the meter comprising a measuring head connected to the vessel and having an electron source, an anode and an ion collector, and an electrical power supply connected to the measuring head for controlling the electron current and the potential distribution in the measuring head, the ion collector being connected with an electrical amplifying device giving an indication and registration of the pressure prevailing in the vessel; the improvement comprising an electrical circuit including a switching means, and said device, the device comprising two amplifiers, the first one of which has a linear response and indication to the ion current, the second one of which has a logarithmic response, and the switching means being capable of selectively switching from the linear amplifier to the logarithmic amplifier, thereby giving a linear or logarithmic indication of the pressure prevailing in the measuring head and in the vessel connected thereto.

2. In the improved ionization vacuum meter of claim 1, a recording instrument indicating the logarithmic response, said recording instrument being connected in the electrical circuit and being switched on by said switching means simultaneously with the logarithmic amplifier.

3. In the improved ionization vacuum meter of claim 1, a recording instrument connected in the electrical circuit, said recording instrument being operated by the logarithmic amplifier when the linear amplifier operates.

4. In the improved ionization vacuum meter of claim 1, the switching means being interposed between the measuring head and the amplifier.

5. In the improved ionization vacuum meter of claim 1, a recording instrument connected in the electrical circuit and having a linear and a logarithmic scale, the switching means being interposed between the amplifier and the recording instrument.

6. In an ionization vacuum meter for measuring pressure changes of a vacuum in a vessel, the meter comprising a measuring head connected to the vessel and having an electron source, an anode and an ion collector, and an electrical power supply connected to the measuring head for controlling the electron current and the potential distribution in the measuring head, the ion collector being connected with an electrical amplifying device giving an indication and registration of the pressure prevailing in the vessel; the improvement comprising an electrical circuit with amplifying device including a linear amplifier, and converter means for converting said linear amplifier to a logarithmic amplifier with appropriate switching means, a first recording instrument having a linear scale and a second recording instrument having a logarithmic scale, said recording instruments connected in the electrical circuit and a second switching means being interposed between the amplifying device and said second recording instrument, the two switching means being operated simultaneously to record the logarithmic response.

References Cited by the Examiner
UNITED STATES PATENTS

| | | | |
|---|---|---|---|
| 2,162,874 | 6/1939 | Wurmser | 324—132 X |
| 2,575,711 | 11/1951 | Hipple et al. | 324—113 X |
| 2,735,062 | 2/1956 | Striker | 324—33 |
| 2,739,283 | 3/1956 | Roehrig | 324—33 |
| 2,870,409 | 1/1959 | Bigelow | 324—132 X |

WALTER L. CARLSON, *Primary Examiner.*